United States Patent [19]

Sakai et al.

[11] Patent Number: 4,902,067

[45] Date of Patent: Feb. 20, 1990

[54] AIR SPOILER RETRACTING DEVICE

[75] Inventors: Kunio Sakai; Hiromitsu Nishikawa; Masaharu Matsumoto, all of Yokohama, Japan

[73] Assignee: Ohi Seisakusho Co., Ltd., Yokohama, Japan

[21] Appl. No.: 318,568

[22] Filed: Mar. 3, 1989

[30] Foreign Application Priority Data

Mar. 5, 1988 [JP] Japan ................................ 63-50617
Mar. 23, 1988 [JP] Japan ............................ 63-37197[U]

[51] Int. Cl.$^4$ ............................................. B62D 35/00
[52] U.S. Cl. ................................ 296/180.1; 74/89.15
[58] Field of Search ................... 296/180.1; 74/89.15, 74/89.16, 424.8 R

[56] References Cited

U.S. PATENT DOCUMENTS

| | | | |
|---|---|---|---|
| 4,131,308 | 12/1978 | Holka et al. | 296/1 S |
| 4,778,212 | 10/1988 | Tomforde | 296/180.1 |
| 4,810,021 | 3/1989 | Burst | 296/180.1 |

FOREIGN PATENT DOCUMENTS 3715974 11/1987 Fed. Rep. of Germany .
152675 9/1983 Japan .
59-156875 9/1984 Japan .
61-222875 10/1986 Japan .
62-268778 11/1987 Japan .
2131368A 6/1984 United Kingdom .

Primary Examiner—Robert R. Song
Attorney, Agent, or Firm—Foley & Lardner, Schwartz, Jeffery, Schwaab, Mack, Blumenthal & Evans

[57] ABSTRACT

Herein disclosed is an air spoiler retracting device which comprises a casing; a reversible electric motor disposed in the casing and having a drive shaft; a carry bar held by the casing and axially movable in parallel with the axis of the drive shaft, the carry bar having one end to which a spoiler proper is connected; a first transmission mechanism including a first gear driven by the drive shaft of the motor and a second gear meshed with the first gear; a second transmission mechanism for converting the rotational movement of the second gear to the axial movement of the carry bar; a pivoting mechanism for permitting a pivotal movement of the carry bar relative to the second transmission mechanism; and a pivoting movement assisting mechanism for assisting the function of the pivoting mechanism, the assisting mechanism including at least one elastomeric member sandwiched between attached two parts.

16 Claims, 4 Drawing Sheets

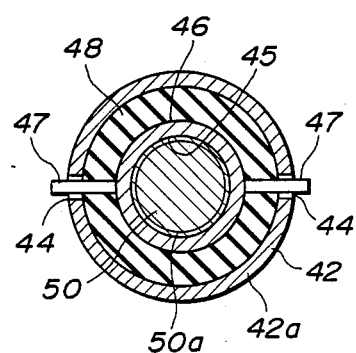
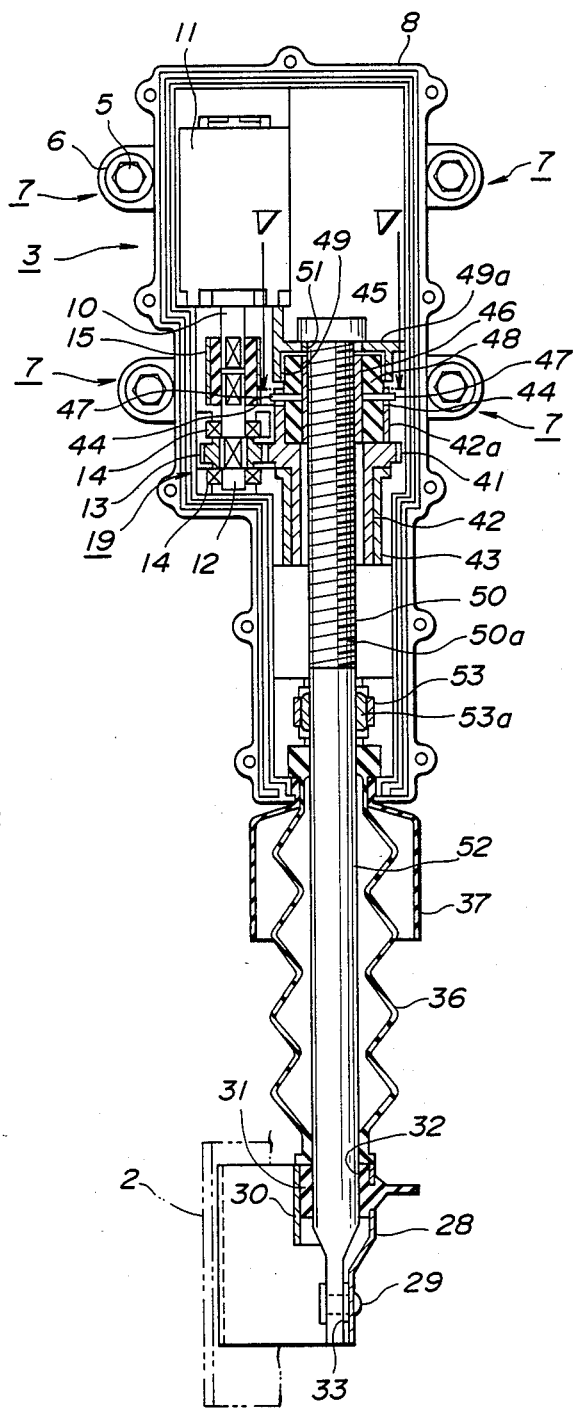
FIG. 4
FIG. 5

AIR SPOILER RETRACTING DEVICE

BACKGROUND OF THE INVENTION

1. Field of the Invention

The present invention relates in general to an air spoiler mounted to a front lower portion of a motor vehicle, and more particularly to a device for retracting the air spoiler. More specifically, the present invention is concerned with an air spoiler retracting device which moves the air spoiler linearly up and down.

2. Description of the Prior Art

In order to improve the streamlining of moving vehicles by reducing the airflow under the vehicle, some of the modernized motor vehicles are equipped with an air spoiler which is mounted to a front lower portion of the vehicle. Such air spoiler is known as a "chin spoiler".

Some of the chin spoilers are of a retractable type in which the spoiler proper is kept retracted in a container area of the vehicle when the vehicle is at no or low speed, but the same becomes exposed to the outside of the vehicle when the vehicle reaches critical speeds where such device is effective or beneficial.

Japanese Patent First Provisional Publications Nos. 59-156875 and 61-222875 show some of the chin spoilers of such retractable type.

However, due to their inherent constructions, the retractable chin spoilers disclosed by the publications are bulky in size. In fact, the retracting devices of these chin spoilers are bulkily constructed and thus there is a need of providing the vehicle body with an enlarged area for mounting of the spoiler arrangement.

SUMMARY OF THE INVENTION

It is therefore an object of the present invention to provide a retracting device of an air spoiler, which is compact in size.

According to the present invention, there is provided an air spoiler retracting device which comprises a casing; a reversible electric motor disposed in the casing and having a drive shaft; a carry bar held by the casing and axially movable in parallel with the axis of the drive shaft, the carry bar having one end to which a spoiler proper is connected; a first transmission mechanism including a first gear driven by the drive shaft of the motor and a second gear meshed with the first gear; a second transmission mechanism for converting the rotational movement of the second gear to the axial movement of the carry bar; first means for permitting a pivotal movement of the carry bar relative to the second transmission mechanism; and second means for assisting the function of the first means, the second means including at least one elastomeric member sandwiched between attached two parts.

BRIEF DESCRIPTION OF THE DRAWINGS

Other objects and advantages of the present invention will become apparent from the following description when taken in conjunction with the accompanying drawings, in which:

FIG. 4 is a view similar to FIG. 2, but showing a second embodiment of the present invention;

FIG. 5 is a sectional view taken along the line V—V of FIG. 4;

DETAILED DESCRIPTION OF THE INVENTION

In the following description, the terms "upper", "lower", "upward", "downward", "right", "left" and the like are to be understood with respect to the drawings on which the corresponding parts are illustrated.

Figure 1:
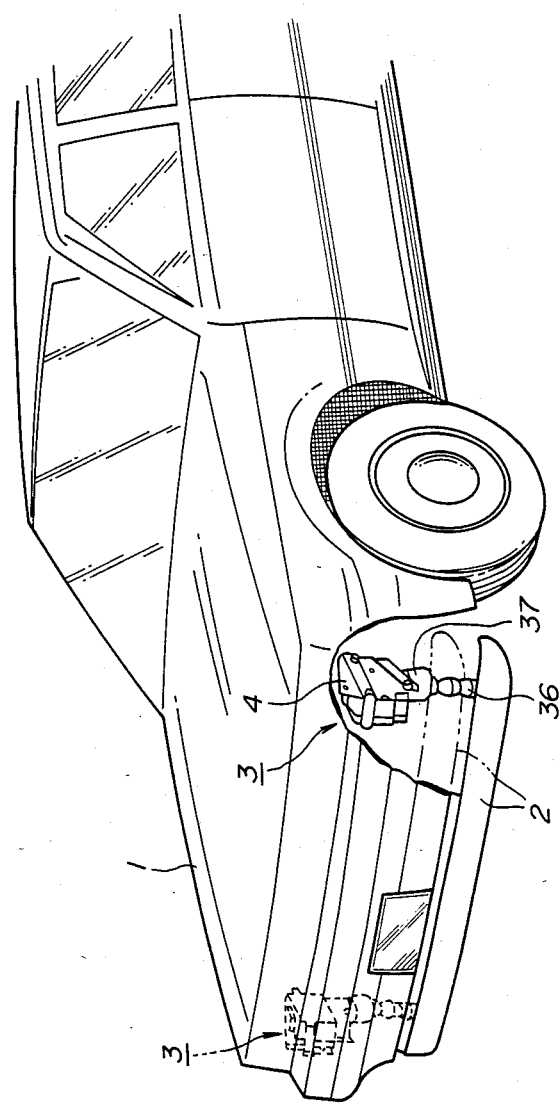
FIG. 1 is a perspective, but partially cut, view of a front portion of a passenger motor vehicle to which the present invention is practically applied.

Referring to FIG. 1, there is shown a passenger motor vehicle to which the present invention is practically applied.

In the drawing, denoted by numeral 1 is a vehicle body, 2 is a front air spoiler (viz., chin spoiler) and 3 is a spoiler retracting device mounted at each side of a front portion of the vehicle body 1. Due to operation of the two retracting devices 3, the air spoiler proper 2 is moved substantially vertically between a lower or operative position as shown by a solid line and an upper or retracted position as shown by a phantom line.

Because the two retracting devices 3 are substantially the same in construction except for a symmetrical relation with which the corresponding parts of the devices are arranged, the following description will be directed to only one device, that is, the device 3 shown by a solid line, for avoiding repeated explanation.

Figure 2:
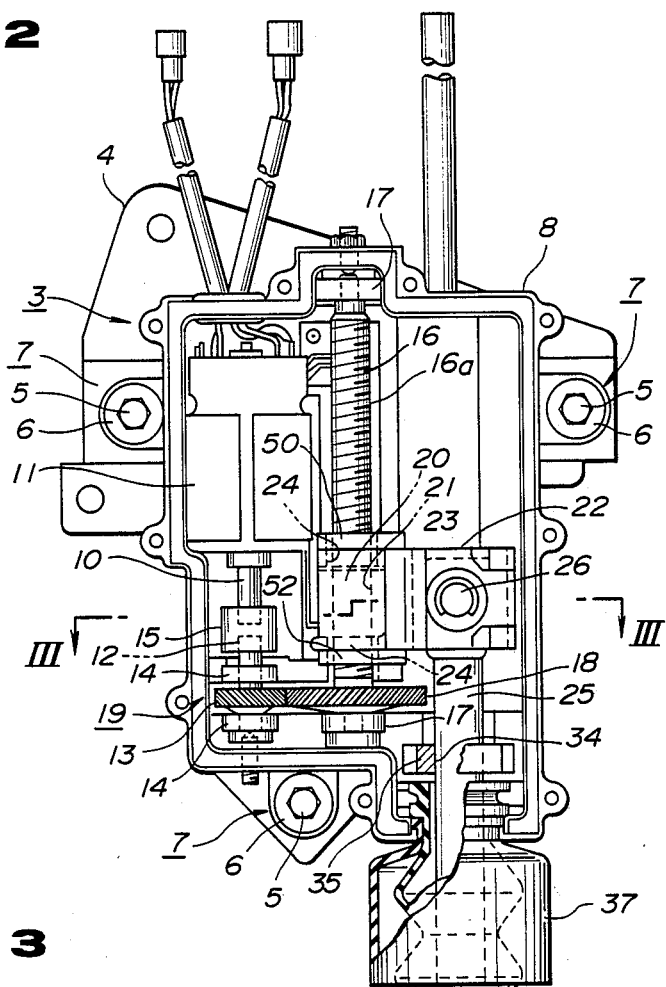
FIG. 2 is a partially cut side view of an air spoiler rectracting device which is a first embodiment of the present invention.
Figure 3:
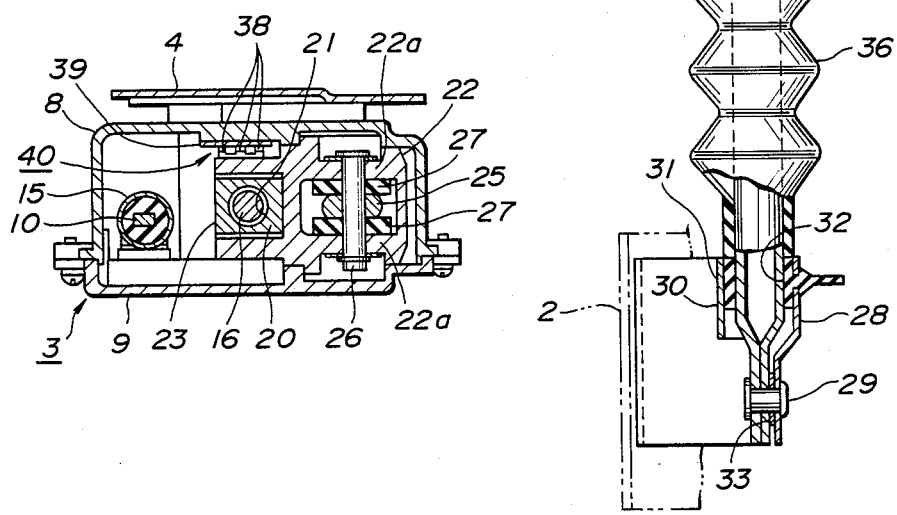
FIG. 3 is a sectional view taken along the line III—III of FIG. 2.

Referring to FIGS. 2 and 3, particularly FIG. 2, there is shown an air spoiler retracting device 3 which is a first embodiment of the present invention.

The device 3 comprises a rectangular casing 8 which is secured through mounting means 7 to a bracket 4 secured to the vehicle body 1. The mounting means 7 includes bolts 5 and elastomeric mounts 6. As is seen from FIG. 3, a lid 9 is bolted to the casing 8 to cover the interior of the same.

A reversible electric motor 11 is disposed in an upper left part of the interior of the casing 8 having its drive shaft 10 directed downward.

At a lower side of the motor 11, there is disposed a helical gear 13 which has a shaft 12 coaxial with the drive shaft 10 of the motor 11. Two bearings 14 are used for rotatably holding the shaft 12. The shaft 12 is connected to the drive shaft 10 of the motor 11 by means of a coupling 15 to be driven by the motor.

A threaded shaft 16 is rotatably disposed in the casing 8 beside the motor 11, which extends in parallel with the drive shaft 10 of the motor 11. Upper and lower bearings 17 are mounted to the casing 8 for bearing the threaded shaft 16. The threaded shaft 16 has at its lower part a helical gear 18 which is meshed with the above-mentioned helical gear 13.

Thus, the coupling 15 and the two helical gears 13 and 18 constitute a so-called "transmission mechanism" 19 through which the threaded shaft 16 is operatively connected to the drive shaft 10 of the motor 11. That is, upon energization of the motor 11, the threaded shaft 16 is rotated in one or the other direction about the axis thereof.

Meshed with an external thread 16a of the threaded shaft 16 is a threaded bore 21 of a rectangular nut 20.

Designated by numeral 22 is a slider which is positioned at a right side, as viewed in FIG. 2, of the interior of the casing 8. The slider 22 is movable in parallel with the axis of the threaded shaft 16. The slider 22 has at its leading end portion a rectangular bore 23 in which the rectangular nut 20 is received. Upper and lower walls of the rectangular bore 23 are formed with respective openings 24 through which the threaded shaft 16 passes to engage with the rectangular nut 20. The upper and lower walls of the bore 23 are respectively equipped with elastomeric members 50 and 52 for absorbing a shock produced when the slider 22 is brought into contact with upper and lower stopper portions of the casing 8.

Figure 6:
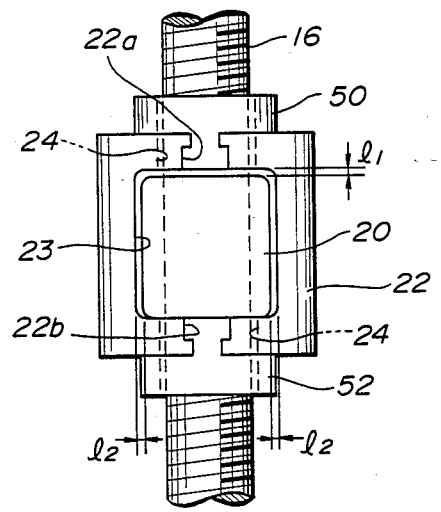
FIG. 6 is a front view of a slider and its partner parts, which are employed in the first embodiment.

As is seen from FIG. 6, preferably, the size of the rectangular bore 23 is somewhat larger than that of the rectangular nut 20, so that the nut 20 can play somewhat in the bore 23. As is understood from this drawing, the rectangular bore 23 is formed larger than the rectangular nut 20 by a degree corresponding to the clearances denoted by "$l_1$" and "$l_2$". The openings 24 of the upper and lower walls of the bore 23 are slightly larger in diameter than the threaded shaft 16. For facilitating insertion of the rectangular nut 20 into the bore 23 of the slider 22, the leading end of the slider 22 has upper and lower cuts 22a and 22b which are merged with the rectangular bore 23. The upper and lower elastomeric members 50 and 52 have respective bores through which the threaded shaft 16 passes.

A carry bar 25 extends downwardly from the casing 8, which is pivotally connected at its upper end to the slider 22. For this connection, a pivot pin 26 carried by the slider 22 is employed, which passes through the upper end of of the carry bar 25.

As is seen from FIG. 3, a pair of elastomeric members 27 are sandwiched between the carry bar 25 and opposed walls 22a of the slider 22 for achieving a controlled pivoting of the bar 25 about the pivot pin 26 relative to the slider 22. Due to provision of the elastomeric members 27, the carry bar 25 can pivot but slightly about an axis perpendicular to the pivot pin 26.

A lower end of the carry bar 25 is connected to a bracket 28 of the spoiler proper 2 by means of a connecting pin 29. As shown, a portion of the bar 25 just above the pin 29 is received in a central bore 32 of an elastomeric body 31 which is sandwiched between the bracket 28 and a press plate 30. Thus, a slightly pivotal connection is achieved between the carry bar 25 and the spoiler proper 2.

A spacer ring 33 is disposed about the connecting pin 29 between the bracket 28 and the carry bar 25 for assisting the pivotal connection between the carry bar 25 and the spoiler proper 2.

The casing 8 has at its right lower part a bearing member 35 for bearing the carry bar 25, which member has a bore 34 defined by a convex inner surface.

Designated by numeral 36 is a longitudinally extensible boot which covers an exposed part of the carry bar 25 for protecting the same from rain drops, splashed water and the like. An upper end of the boot 36 is fixted to the casing 8 and a lower end of the same is sealingly connected to the elastomeric body 31.

Designated by numeral 37 is a cylindrical cover which is connected to the casing 8 having its open side directed downward and having the boot-covered carry bar 25 passed therethrough. The cover 37 is sized to accommodate the entire of the boot 36 when the latter is collapsed.

As is seen from FIG. 2, a position sensing device 40 is arranged in the casing 8, which controls operation of the motor 11 depending on a position which the slider 22 assumes. The device 40 comprises a plurality (three in the illustrated embodiment) of brushes 38 mounted on one side wall of the slider 22. The brushes 38 are electrically contactable at their leading ends with contact plates (not shown) mounted on a support board 39 secured to an inner wall of the casing 8. That is, by having one of the brushes 38 separated from the corresponding one of the contact plates, the uppermost and lowermost positions of the slider 22 are detected, where energization of the motor 11 is ceased.

If desired, two limit switches may be used for sensing the two positions of the slider 22. In this case, the switches are located at upper and lower positions in the casing 8.

In the following, operation of the retracting device 3 will be described. It is to be noted that the other retracting device 3 illustrated by a phantom line in FIG. 1 operates in substantially the same manner.

When, due to energization of the motor 11, the drive shaft 10 of the same is turned in a counterclockwise direction in FIG. 3, the threaded shaft 16 is turned about its axis in a clockwise direction in FIG. 3 through the transmission mechanism 19 thereby moving the nut 20 upward. Thus, the slider 22 which carries the nut 20 is moved upward, and thus the carry bar 25 is moved upward lifting the spoiler proper 2.

When the slider 22 is moved up to the uppermost position detected by the position sensing device 40, energization of the motor 11 is stopped. Under this condition, the carry bar 25 assumes its uppermost position and thus the spoiler proper 2 is fully received in a container portion defined by the front lower part of the vehicle body 1, that is, just behind a front bumper of the vehicle. The boot 36 thus collapsed is fully received in the cover 37.

When now, due to energization of the motor 11 with a reversed current flow, the drive shaft 10 is turned in a reversed direction, that is, in a clockwise direction in FIG. 3, the threaded shaft 16 is turned in a counterclockwise direction thereby causing the slider 22, the carry bar 25 and the spoiler proper 2 to move downward.

When the slider 22 is moved down to the lowermost position detected by the position sensing device 40, energization of the motor 11 is ceased. Under this condition, the carry bar 25 assumes its lowermost position and thus the spoiler proper 2 is fully exposed to the outside of the vehicle assuming its operative position.

The above-mentioned operation is also carried out in the other retracting device 3 in a synchronized manner.

Even if, for some reason, operations of the two retracting devices 3 are carried out with a slight phase gap therebetween, the asynchronous movements of the corresponding parts of the respective devices are also permitted by the compensating function of the elastomeric members 27, 31 and the connecting pin 29. Such asynchronous movements are ceased when the spoiler proper 2 is moved to the operative or retracted position.

Because of provision of a certain gap between the nut 20 and the bore 23 of the slider 22, a so-called "universal joint connection" is provided between the threaded shaft 16 and the slider 22. Thus, even if an unbalanced load is applied to the two retracting devices 3, the universal joint connection compensates the unbalanced movements of the corresponding parts of the two devices thereby carrying out an available upward and downward movement of the spoiler proper 2. Due to provision of the certain gap, undesired stick phenomenon is not induced between the threaded shaft 16 and the slider 22.

Figure 7:
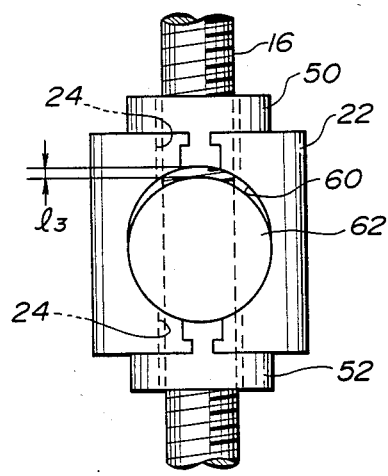
FIG. 7 is a view similar to FIG. 6, but showing a modification of the first embodiment.

FIG. 7 shows a modification of the first embodiment. In this modification, a cylindrical bore 60 is formed in the slider 22 and a cylindrical nut 62 meshed with the threaded shaft 16 is received in the bore 60. The size of the bore 60 is somewhat larger than that of the nut 62 by a degree corresponding to the clearance indicated by "$l_3$". In this modification, the "universal joint connection" is also provided between the threaded shaft 16 and the slider 22 and thus the above-mentioned advantageous phenomenon is effected.

Referring to FIGS. 4 and 5, there is shown a second embodiment of the present invention.

The parts corresponding to those of the above-mentioned first embodiment are denoted by the same numerals and detailed description of them will be omitted from the following.

In this second embodiment, a geared cylindrical member 42 is disposed in the casing 8 through a cylindrical bearing 43, so that the member 42 is rotatable about an axis which is in parallel with the axis of the drive shaft 10 of the motor 11. That is, the cylindrical member 42 has at its generally middle part an external helical gear 41 meshed with the helical gear 13 driven by the motor 11.

An upper part 42a of the cylindrical member 42 is formed at its diametrically opposed portions with aligned slots 44.

A collar 46 with a threaded bore 45 is coaxially but partially disposed in the upper part 42a of the cylindrical member 42 with a lower half of an annular elastomeric member 48 disposed therebetween. The collar 46 has two radially extending arms 47 engaged with the slots 44 respectively.

The coaxially mated upper halves of the collar 46 and annular elastomeric member 48 are rotatably disposed in a cylindrical bore 49 formed in the casing 8. By the provision of an upper wall 49a of the bore 49 and a bottom wall of the upper part 42a of the member 42, the unit consisting of the elastomeric member 48 and collar 46 is suppressed from making an axial movement relative to the casing 8.

Engaged with the threaded bore 45 of the collar 46 is a threaded upper part 50 of a carry bar 52 which extends in parallel with the axis of the drive shaft 10 of the motor 11. The thread of the part 50 is indicated by 50a.

As shown, the carry bar 52 passes through the geared cylindrical member 42 and an opening 51 which is formed in the upper wall 49a of the bore 49.

Designated by numeral 53 is a pivotal bearing member which is positioned at a lower part of the casing 8 to pivotally support or bear the carry bar 52. The bearing member 53 comprises an apertured core 53a through which the carry bar 52 slidably passes and a holder (no numeral) which is secured to the casing 8 and pivotally holds therein the core 53a. That is, the carry bar 52 is somewhat pivotal about a center of the bearing member 53 relative to the casing 8.

Similar to the case of the above-mentioned first embodiment, the lower end of the carry bar 52 is connected to the spoiler proper 2. Due to the connection with the bracket 28 through the connecting pin 29, the carry bar 52 is prevented from rotation about its axis.

In this second embodiment, the coupling 15, the helical gear 13, the geared cylindrical member 42 and the arms 47 constitute the transmission mechanism 19 by which the power of the drive shaft 10 of the motor 11 is transmitted to the internally threaded collar 46.

Although not shown in the drawings, a position sensing device identical to the device 40 of the first embodiment is employed for controlling operation of the motor 11 in response to the upward and downward movement of the carry bar 52. Such device is arranged between an enlarged head of the carry bar 52 and an inner wall of the casing 8.

When, in operation, the drive shaft 10 of the motor 11 is turned in a certain direction, the transmission mechanism 19 turns the collar 46 in a clockwise direction in FIG. 5. With this, the carry bar 52 meshed with the collar 46 is raised upward lifting the spoiler proper 2.

When the drive shaft 10 of the motor 11 is now turned in a reversed direction, the collar 46 is turned in a counterclockwise direction in FIG. 5 thereby lowering the carry bar 52 and thus the spoiler proper 2.

Even if, for some reason, operations of the two retracting devices 3 are carried out with a slight phase gap therebetween, the asynchronous movements of the corresponding parts of the respective devices are permitted by the compensating function of the elastomeric members 48 and 31 and the pivotal bearing 53 thereby carrying out the upward and downward movement of the spoiler proper 2.

As will be understood from the foregoing description, the essential parts, such as motor 11, the threaded shaft 16 (in case of the first embodiment) and the carry bar 25 or 52 are arranged in parallel with one another. This parallel arrangement brings about a compact construction of the air spoiler retracting device.

What is claimed is:

1. An air spoiler retracting device comprising:
a casing;
a reversible electric motor disposed in said casing and having a drive shaft;
a carry bar held by said casing and axially movable in parallel with the axis of said drive shaft, said carry bar having a first end to which a spoiler proper is connected;
a first transmission mechanism including a first gear driven by said drive shaft of the motor and a second gear meshed with said first gear;
a second transmission mechanism for converting the rotational movement of said second gear to the axial movement of said carry bar;
first means for permitting a pivotal movement of said carry bar relative to said second transmission mechanism; and
second means for assisting the function of said first means, said second means including at least one elastomeric member sandwiched between attached two parts.

2. An air spoiler retracting device as claimed in claim 1, further comprising:
a longitudinally expansible boor which covers said carry bar; and
a cylindrical cover member connected to said casing having its open side directed toward said first end of said carry bar, said cover member being so sized as to fully receive said boot when the latter is fully collapsed.

3. An air spoiler retracting device as claimed in claim 2, in which said first means comprises an apertured bearing member which is secured to said casing for passing therethrough said carry bar.

4. An air spoiler retracting device as claimed in claim 3, in which the bore of said bearing member is difined by a convex inner surface.

5. An air spoiler retracting device as claimed in claim 4, in which said second means comprises an elastomeric member interposed between said second transmission mechanism and said carry bar, and another elastomeric member interposed between said carry bar and said spoiler proper.

6. An air spoiler retracting device as claimed in claim 5, in which said first and second gears of said first transmitting mechanism are of a helical gear type.

7. An air spoiler retracting device as claimed in claim 6, in which said second transmission mechanism comprises:
 a threaded shaft extending in parallel with the axis of said drive shaft of the motor, said threaded shaft being driven by said second gear;
 a nut meshed with said threaded shaft; and
 a slider including one end which holds said nut and the other end which pivotally holds a second end of said carry bar.

8. An air spoiler retracting device as claimed in claim 7, in which said slider has therein a bore in which said nut is received, said bore being slightly larger than said nut thereby to permit said nut to play in the bore.

9. An air spoiler retracting device as claimed in claim 8, in which the other end of said slider is connected to the second end of said carry bar by means of a pivot pin.

10. An air spoiler retracting device as claimed in claim 3, in which said bearing member comprises an apertured core through which said carry bar is slidably passed and a holder which is secured to said casing and pivotally receives therein said apertured core.

11. An air spoiler retracting device as claimed in claim 10, in which said second means comprises an elastomeric member interposed between said second transmission mechanism and said carry bar, and another elastomeric member interposed between said carry bar and said spoiler proper.

12. An air spoiler retracting device as claimed in claim 11, in which said first and second gears of said first transmission mechanism are of a helical gear type.

13. An air spoiler retracting device as claimed in claim 12, in which said second transmission mechanism comprises:
 a portion of said carry bar, said portion being threaded;
 a cylindrical member rotatably disposed about the threaded portion of said carry bar, said cylindrical member having said second gear integrally mounted thereon;
 a collar having a threaded bore which is meshed with said threaded portion of said carry bar; and
 joining means for joining said cylindrical member and said collar to achieve a united rotation thereby about the threaded portion of said carry bar.

14. An air spoiler as claimed in claim 13, in which said joining means comprises:
 two arms extending from said collar and engaged with slots formed in said cylindrical member; and
 an annular elastomeric member disposed in an annular space defined between said cylindrical member and said collar.

15. An air spoiler as claimed in claim 8, in which said nut and said bore of the slider are rectangular in shape.

16. An air spoiler as claimed in claim 8, in which said nut and said bore of the slider are cylindrical in shape.

* * * * *